United States Patent [19]

Shah

[11] 4,413,840
[45] Nov. 8, 1983

[54] MECHANISM TO CONTROL AXIAL COLLAPSE OF AN OPEN CROSS-SECTION BEAM

[75] Inventor: Ramesh H. Shah, Dearborn Heights, Mich.

[73] Assignee: Ford Motor Company, Dearborn, Mich.

[21] Appl. No.: 301,791

[22] Filed: Sep. 14, 1981

[51] Int. Cl.³ ............................................. B62D 27/04
[52] U.S. Cl. ...................................... 280/784; 52/731
[58] Field of Search .................. 280/784, 785; 52/731, 52/573; 293/132, 146, 147, 149

[56] References Cited

U.S. PATENT DOCUMENTS

| | | | |
|---|---|---|---|
| 3,794,348 | 2/1974 | Fischer | 280/106 R |
| 3,795,410 | 3/1974 | Huber | 280/106 R |
| 3,811,698 | 5/1974 | Glance | 280/106 R |
| 3,827,712 | 8/1974 | Suznki et al. | 280/106 R |
| 3,869,017 | 3/1975 | Feustel et al. | 280/784 |
| 3,912,295 | 10/1975 | Eggert | 280/784 |
| 3,981,114 | 9/1976 | Chupick | 52/232 |
| 3,983,962 | 10/1976 | Torke | 188/1 C |
| 4,093,254 | 6/1978 | Ezaki | 280/783 |

FOREIGN PATENT DOCUMENTS

| | | | |
|---|---|---|---|
| 2459518 | 1/1976 | Fed. Rep. of Germany | 280/784 |
| 2457400 | 10/1976 | Fed. Rep. of Germany | 280/784 |

*Primary Examiner*—Richard A. Bertsch
*Attorney, Agent, or Firm*—Joseph W. Malleck; Olin B. Johnson

[57] ABSTRACT

A method is disclosed for controlling the axial collapse of an open cross-sectioned beam. Trusses are attached to the beam in a form to angulate between the flanges of the beam and act as stress stabilizers or load resistors. Depressions are formed in the flanges of the beam located intermediate said trusses. The trusses and depressions each have an axial dimension which is about 1/6-½ the spacing between trusses. Upon sufficient loading, the beam collapses with the flanges folding substantially only at said depressions.

14 Claims, 3 Drawing Figures

MECHANISM TO CONTROL AXIAL COLLAPSE OF AN OPEN CROSS-SECTION BEAM

BACKGROUND OF THE INVENTION AND PRIOR ART STATEMENT

It is desirable if elongate frame members for vehicles can be axially collapsed in a manner so that impact energy is dissipated to protect the occupants of the vehicle during a collision or accident. To achieve increased dissipation of energy, frame members have been manufactured in the past with corrugations or fluting extending over a desired length of the frame member (see U.S. Pat. No. 3,811,698), with cuttings in the metal of the frame member to initiate the accordian-like crushing of the frame member (see U.S. Pat. No. 3,794,348), and with softened zones in the frame member brought about by annealing to promote corrugations (see U.S. Pat. No. 3,983,962).

These patents proceed on the theory that weakened zones of the frame member will initiate and multiply the deformation rate and thereby facilitate increased energy dissipation during the collapse of the frame member under heavy axial loading. However, the techniques of these particular patents provide insufficient dissipation of energy because the original structure being weakened inhibits absorption. In addition, the forming of the material with either fluting, cuttings or annealing zones presents difficult manufacturing problems in forming a desired configuration and in providing a desired profile in the frame member.

Other approaches to providing controlled dissipation of energy by collapse of a frame member are disclosed in U.S. Pat. No. 4,093,254 wherein a single fold is employed to provide the controlled collapse, in U.S. Pat. No. 3,795,410 wherein collapse is controlled to be at one locus, and in U.S. Pat. No. 3,981,114 wherein an inner column is inserted within the column to be controlled, but stationed to provide only a second phase of collapse. These represent an effort to isolate the crushing to a small zone so as to control the collapse capability of the structure but limiting energy absorption. Energy absorption is not maximized; less than 60% of the frame structure is collapsed during an axial loading condition.

Others have even ignored the problem of energy absorption by using precurved crush resistors which when inserted within the frame structure at curved portions work against any absorption at these particular zones with no intention of facilitating additional energy dissipation in other zones (see U.S. Pat. No. 3,827,712).

SUMMARY OF THE INVENTION

The invention is a method of controlling axial collapse of an open cross-sectioned beam. Trusses which act as stress stabilizers or load resistors are attached at spaced intervals along the beam; the trusses extend laterally between flanges constituting the angulated walls of the beam section. Depressions are formed in the flanges of the beam located intermediate the spaced trusses, said trusses and depressions each having a dimension along the axis of said beam which is about 1/6-½ the spacing between said trusses. The beam is then subjected to axial loading effective to collapse the flanges of the beam between said trusses, said flanges folding substantially only at said depressions. By this method, the trusses and depressions cooperate to control the deformation of the beam material during axial loading. An additional feature of the invention is the unloaded beam structure resulting from practising the method.

If the open cross-section for said beam is formed as a "C" configuration, the flanges of said cross-section will typically be angulated at about 90° with respect to each other. The trusses are then formed to span between said flanges at about a 45° angle with respect to each of the flanges with which the truss engages. Advantgeously, when the beam is constituted of mild steel, the material thickness is in the range of 0.050–0.250 inches, and the thickness of the trusses is in the range of 0.075–0.18 inches. It is desirable if the lateral length of each of the depressions within said flanges is less than the lateral flange dimension. The depressions can be preferably formed by imprinting indentations in one surface or face of the flange. They also can be formed by imprinting corrogations in the entire thickness of said beam material to form concavities at the precise locations desired. It is necessary that the trusses and depressions be dimensioned so as to promote at least a 60% collapse of the beam material during axial loading, or at least a 60% plastic deformation.

DETAILED DESCRIPTION

Figure 1:
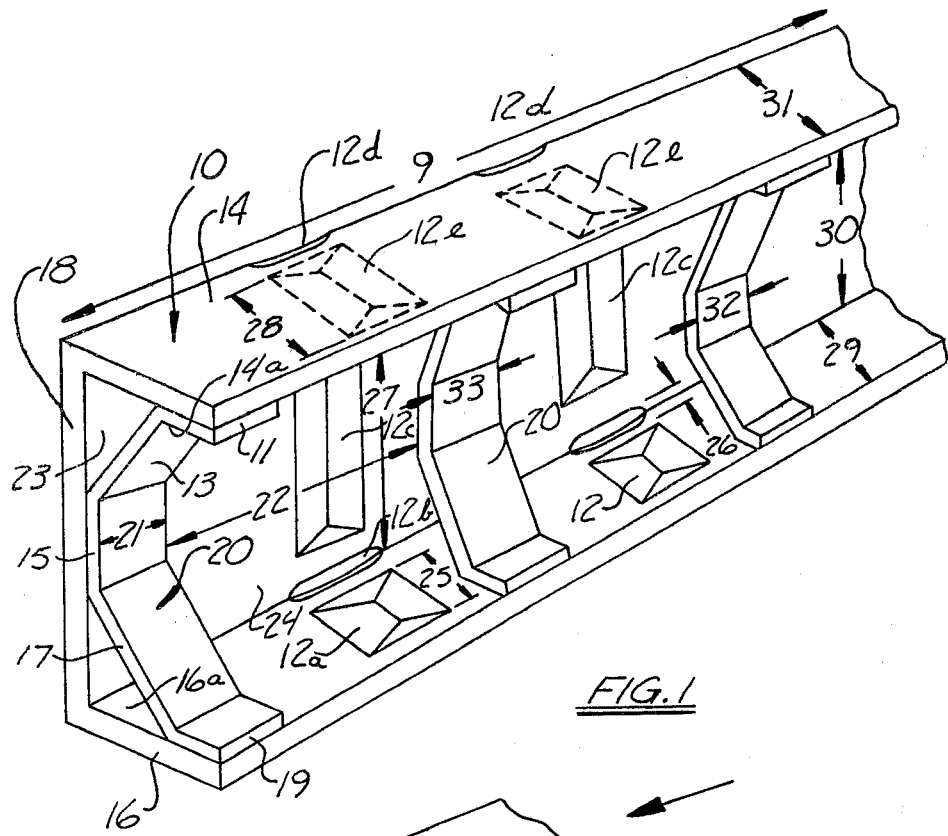
FIG. 1 is a perspective view of a portion of a vehicle frame with the elements of this invention embodied therein.

As shown in FIG. 1, a beam 10, cross-sectioned with a C-shape, is illustrated. It is representative of beams employed as a frame structure for vehicular use. The beam can be constructed of low carbon steel (or other steels such as SAE 950–980 steels) having a uniform thickness in the range of 0.05–0.25 inches, preferably about 0.15 inches. The "C" shape is formed by flanges which include an upright flange 18 and end flanges 14 and 16. These flanges define angulated beam walls oriented at about 90° to each other.

To control the axial collapse of the open cross-sectioned beam, and to promote optimum or increased energy dissipation, the following steps are employed.

1. Trusses 20 are attached at spaced intervals along the longitudinal extent 9 of the beam. Each of the trusses is comprised of steel material having a thickness in the range of 0.75–0.18 inches, preferably about 0.15 inches. The trusses are arranged so as to extend laterally and diagonally between the angulated walls of the open section beam. Here, each of the trusses have a foot 11 which is attached (welded) to the underface 14a of the upper flange 14. A web 13 of each truss extends from foot 11 at about a 45° angle to the upright flange 18 and meets a foot 15 welded to a central or midway section of the upright flange 18. Each truss has another web 17 extending again at a 45° angle to flange 18 to a foot 19 which is attached (welded) to the interior face 16a of the lower flange 16. A plurality of similar trusses are attached in similar fashion, which may also include brazing, bolting, riveting, or other equivalent forms of bonding.

Each of the trusses have an axial dimension 21 which is 1/6-½ the spacing 22 between the trusses. The trusses operate as stabilizers or load resistors at specific locations so that the mass of material 23 juxtaposed to the trusses is stabilized or buttressed so as not to collapse in axial deformation. The material 24 spanning between the stabilized material is free to collapse.

2. Next, depressions 12 are formed, either before or after the attachment of the stabilizers, to the interior faces of the flanges at locations substantially midway between the trusses. In this application, the depressions are formed solely within the inner face of the material by imprinting. Each of the depressions having a lateral length (25-26-27-28) which is less than the respective lateral dimension (29-30-31) of the flange. Specifically, the depression 12a is formed locally within the middle portion of the flange face 16a. Depression 12b is formed at the intersection of the lower flange 16 with the upright flange 18. Depression 12c is formed in the middle of the upright flange 18. Depression 12d is at the intersection of the top flange 14 and upright flange 18. Depression 12e is formed in the middle of the inner face of the upper flange 14. The longitudinal extent 33 of each of the depressions (12a-12b-12c-12d-12e) is generally commensurate with the longitudinal extent 32 of the trusses. The depth of such depressions can be to about 0.25 inches, requiring an indentation or convolution in both surfaces. Preferably, the depth of the depressions is about ⅓ to ½ the thickness of the material, which does not interrupt the opposite face of the respective flange.

Figure 2:
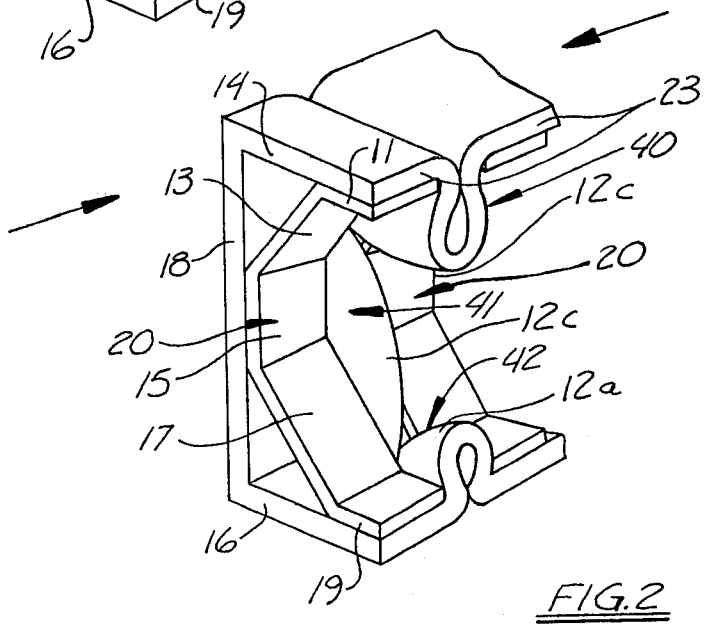
FIG. 2 is a fragmentary view similar to that of FIG. 1 illustrating a portion of the beam in the collapsed condition.

3. The beam is then subjected to axial loading (as shown in FIG. 2) effective to collapse the flanges between the trusses, with the flanges folding substantially at the depressions. For the embodiment illustrated, folding of the material will proceed inwardly of the flanges 14-16-18, in the direction on which side the depressions were formed. If the depressions were formed on the outwardly facing sides of the flanges, the folding 40-41-42 would occur oppositely.

By controlling the spacing between the stabilized or trussed portions 23 of the beam, at least 60% of the beam material will be collapsed telescopically and thereby used in the dissipation of energy. Accordingly, more kinetic energy is transformed into plastic deformation in the crushable zone, optimizing the performance of the beam structure herein. The crushable zone is maximized with this invention.

As a specific example, the method was tested on a C-beam having a height of 8.0 inches, flange widths of 2.5 inches and 2.5 inches. The material employed for the beam was SAE 950-980 steel, and also low carbon steel, and having a thickness of 0.150 inches. The flange stabilizers or trusses had an axial dimension of 1.0 inches, and extended between flanges as shown in FIG. 1.

Figure 3:
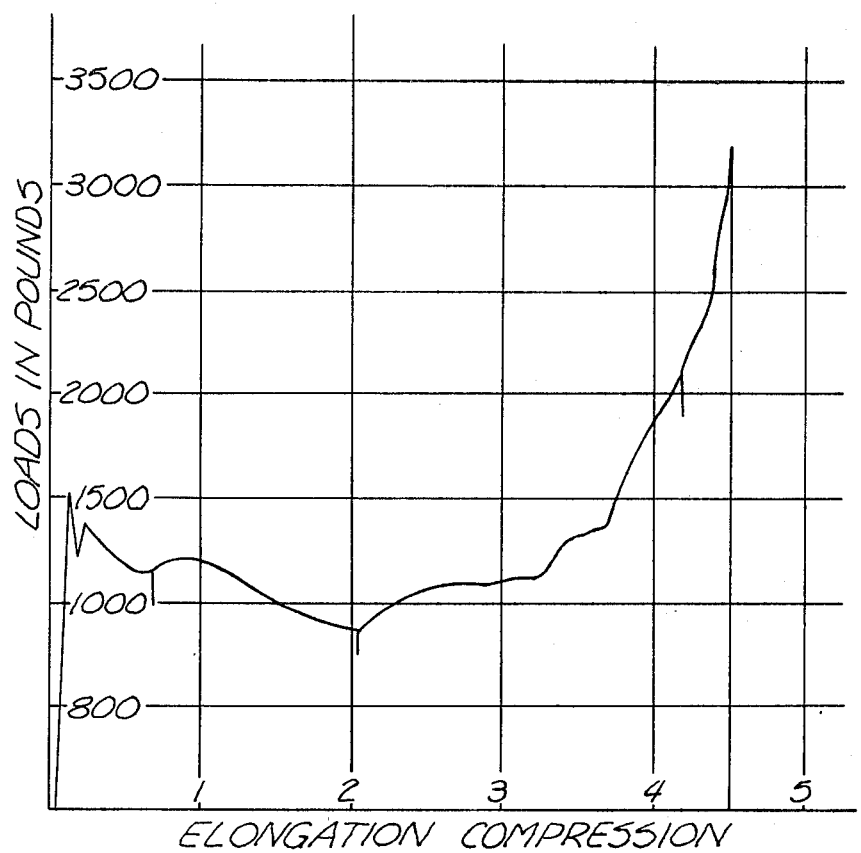
FIG. 3 is a graphical illustration of beam loading as a function of compression in an elongate direction along the beam.

As shown in FIG. 3, and during a time interval of 0.2 seconds, the loading was increased to 1500 pounds and plastic deformation began to take place progressively over a compression distance of 1 to 3 inches. The loading was increased after 3 inches was experienced so that the loading dramatically increased to 3000 pounds, causing an abrupt collapse of the beam after about 4½ inches of elongation compression was experienced. The amount of kinetic energy that was absorbed was approximately 6800 ft/lb, and 60% of the material was plasticailly deformed.

I claim:

1. A method of controlling the axial collapse of an open cross-sectioned beam having flanges constituting angulated walls of the beam, comprising:
    (a) attaching trusses at spaced intervals along said beam, said trusses extending laterally between angulated walls of
    (b) forming depressions in said flanges located at least intermediate said trusses, said trusses and depressions each having an axial dimension which is about 1/6-½ the spacing between said trusses; and
    (c) subjecting said beam to axial loading effective to collapse said flanges between said trusses, said flanges folding substantially only at said depressions.

2. The method as in claim 1, in which in step (b) said depressions are also formed at the intersection of said flanges.

3. The method as in claims 1 or 2, in which said depressions are formed as slots in one surface of said flanges.

4. The method as in claim 1, in which said depressions are formed in each of the interior faces of said beam walls at said substantially midway locations between said trusses.

5. The method as in claim 1, in which said beam cross-section is formed as a "C", with the flanges angulated at about 90° with respect to each other, and said trusses extending laterally between adjacent flanges at an angle of about 45° with respect to each of the flanges with which the truss engages.

6. The method as in claim 1, in which said material consists essentially of low carbon steel, said beam material having a thickness in the range of 0.05-0.25 inches, and said truss sections having a material thickness in the range of 0.075-0.18 inches.

7. The method as in claim 1, in which the lateral extent of each intermediately located depression is less than the lateral length of the wall in which the depression is formed.

8. The method as in claim 1, in which at least 60% of said beam material is collapsed during loading.

9. The method as in claim 1, in which said depressions are formed by imprinting convolutions into said walls.

10. The method as in claim 1, in which at least 60% of said material is plastically deformed during loading.

11. The method as in claim 1, in which said depressions are formed into the interior face of said flanges and said folding takes place inwardly toward the interior of said flanges.

12. A beam structured to control axial collapse during axial loading, comprising:
    (a) an elongate beam having a generally open cross-sectioned configuration defined by flanges angulated with respect to each other;
    (b) a plurality of trusses attached to the interior faces of each pair of adjacent flanges at spaced locations therealong, said trusses angulating between said flanges;
    (c) depressions formed in the interior faces of said flanges located substantially midway between said trusses, each of said depressions having a dimension forming a fraction of the lateral extent of each of said flanges.

13. The beam as in claim 12, in which said trusses and depressions each have an axial dimension of 1/6-½ the spacing between said trusses.

14. The beam as in claim 12, in which said trusses extend at an angle of about 45° to each of the flanges to which the truss is attached.